Sept. 18, 1934.        J. E. LILIENFELD              1,974,284
           POWER FACTOR CORRECTED GAS DISCHARGE TUBE
                       Filed Aug. 4, 1931
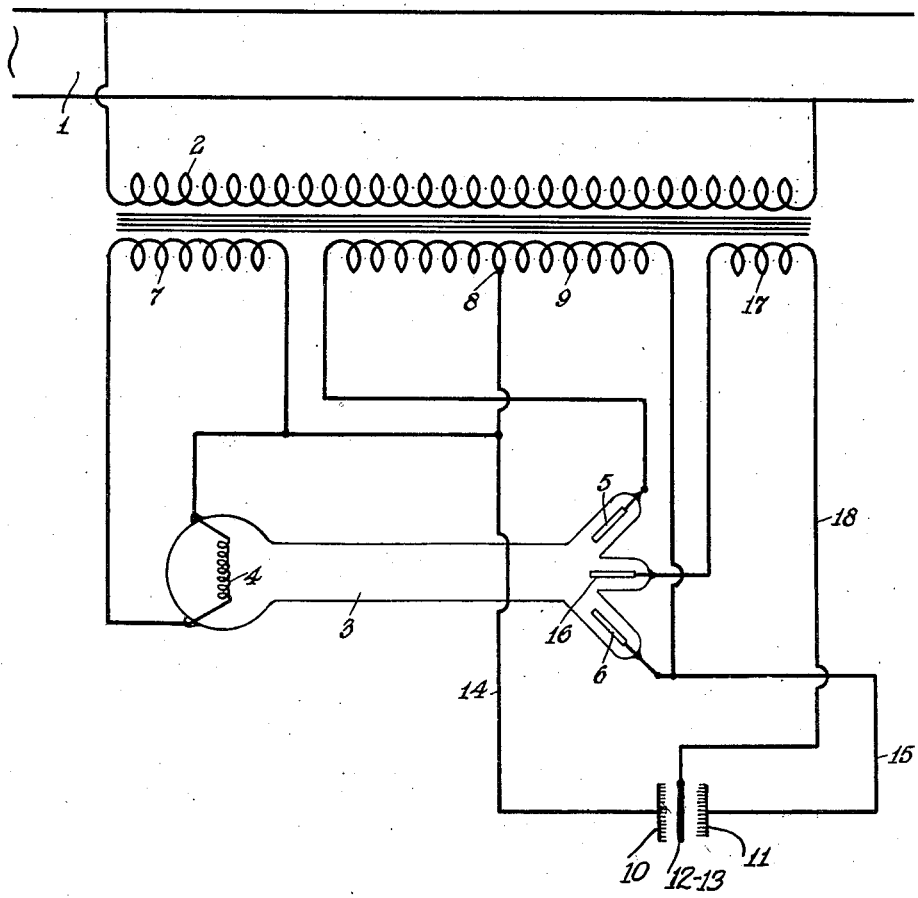
INVENTOR
JULIUS EDGAR LILIENFELD
BY
ATTORNEY Patented Sept. 18, 1934

1,974,284

UNITED STATES PATENT OFFICE 1,974,284

POWER FACTOR CORRECTED GAS DISCHARGE TUBE

Julius Edgar Lilienfeld, Winchester, Mass., assignor to Ergon Research Laboratories, Inc., Malden, Mass., a corporation of Delaware Application August 4, 1931, Serial No. 554,968

10 Claims. (Cl. 176—124)

The invention relates to the operation of luminescent or gas discharge tubes, such as the well known neon type, embodying generally two anodes and a cathode connected across a source of alternating current. When thus connected across an alternating current line, the operation of this type of lamp or illumination element has been found to retard appreciably the phase angle of the power input, so that power factors as low as 40% are common in the operation of these lamps. This low factor represents a substantial loss, and it is an object of the invention to reduce the same materially.

It is well known that the phase angle may be corrected by inserting a suitable capacitance. While any type of condenser may be utilized for this purpose, condensers of the symmetric type, such as paper, mica, oil, etc. condensers, are generally too expensive in view of the relatively large capacitance required and, furthermore, break down occasionally and are not self-healing.

A further object of the invention resides in the provision of a relatively inexpensive and reliable condenser of substantial capacity together with further means for association with lamps of the type aforesaid and whereby the usual phase displacement may be materially corrected. Another object of the invention is to utilize one of the lamp elements to this end.

I have found that if asymmetric condensers, e. g. the well known electrolytic condensers, be connected in circuit in the manner hereinafter set forth, a very efficient and relatively inexpensive corrective means is afforded.

I have further discovered that if such condenser be connected across the cathode and one of a pair of the lamp anodes—all three electrodes of such lamp being energized, as is the usual practice, from one transformer with the condenser connected to the central tap and one of the terminals of the transformer to receive but one-half the full voltage applied to the tube—the electrolyte of such condenser may be maintained constantly at a potential more negative than that of the associated condenser anodic electrodes.

In order to provide this bias, rectification of a portion of the current is required, which may be conveniently afforded in part by an element of the tube itself. Thus, if there be associated with the cathode of the tube an auxiliary or third anode and the latter connected to the electrolyte or cathode electrodes of the condenser, the said electrolyte will be negatively biased. It is desirable, furthermore, to supplement this bias, for example, in impressing an additional potential upon the said connection between the auxiliary anode and electrolyte and which potential is obtained, preferably, through a transformer coil associated with the main power supply of the lamp.

The nature of the invention, however, will best be understood when described in connection with the accompanying drawing, which is a diagrammatic representation of a neon tube provided with the auxiliary anode and the condenser and rectifier connections.

Referring to the drawing, 1 designates a suitable source of A. C. supply and across which is connected the primary coil 2 of a transformer. A neon or like tube is designated by the glass envelope 3 in which is mounted at one end and in well known manner the filament or cathode 4 and at the opposite end the two anodes 5 and 6. Filament 4 is arranged to be heated through the secondary coil 7 associated with primary coil 2 and is connected, also, to the neutral point 8 of an additional secondary coil 9 associated with coil 2. The opposite ends of secondary coil 9 in turn are arranged to be connected to the respective anodes 5 and 6, and the apparatus thus far described differs in no essential particular from the usual well known type of lamp of this character.

As hereinbefore noted, however, when utilized in this fashion the operation is under very high power factor. In accordance with the invention, an electrolytic condenser of any well known or special design and represented by the anodes 10 and 11 and cathode electrodes (electrolyte) 12 and 13 is connected respectively by means of leads 14 and 15 across the cathode 4 of the neon tube and one of the anodes thereof, as the anode 6.

To short-circuit an anode of the condenser to its electrolyte (cathode) only for current arriving negatively at the said anode, a further or auxiliary anode 16 is located at the anodic end of the envelope 3, say between the two anodes 5 and 6, and the same is connected through an additional biasing potential to the electrolyte (cathodes 12, 13). A satisfactory and simple additional bias may be afforded by a further small secondary coil 17 associated with the primary 2 and included in series in the lead 18 connecting auxiliary anode 16 with the cathodes 12, 13.

I claim:

1. The combination with an alternating current operated gas discharge luminescent tube and embodying anodes and a cathode; of means associated with the cathode for rectifying a portion of the applied current, and an asymmetric condenser connected across the tube and to the rectifying means adapted to receive one-half of the full voltage applied to the tube.

2. The combination with an alternating current operated gas discharge luminescent tube and embodying anodes and a cathode; of means associated with the cathode for rectifying a portion of the applied current, an asymmetric condenser connected across one of the anodes and the cathode of the tube for correcting the phase angle of the lamp power input, and a connection from the rectifying means to the cathode of said condenser to bias the same negatively.

3. The combination with an alternating current operated gas discharge luminescent tube and embodying a pair of anodes and a cathode; of means associated with the cathode of the tube for rectifying a portion of the applied current, an electrolytic condenser connected across the said cathode and one of the anodes of the tube for correcting the phase angle of the lamp power input, and a connection from the rectifying means to the electrolyte of said condenser to bias the same negatively.

4. The combination with an alternating current operated gas discharge luminescent tube and embodying a pair of anodes and a cathode; of an asymmetric condenser connected across one of the anodes and the cathode of the tube for correcting the phase angle of the lamp power input, and an additional anode associated with the cathode of the tube adapted to short-circuit an anode of the condenser to its cathodic electrode only for current arriving negatively at said anode.

5. The combination with an alternating current operated gas discharge luminescent tube and embodying a pair of anodes and a cathode; of an asymmetric condenser connected across one of the anodes and the cathode of the tube for correcting the phase angle of the lamp power input, an additional anode associated with the cathode of the tube adapted to short-circuit an anode of the condenser to its cathode only for current arriving negatively at said anode, and means to supplement the negative bias of the cathode of the condenser.

6. In combination: a transformer having its primary connected across a source of alternating current, a gas discharge luminescent tube embodying a pair of anodes and a cathode, a secondary coil of said transformer connected across the cathode for energizing the same, a further secondary coil of the transformer connected across the two tube anodes and a connection from the neutral point of said further secondary coil to the said cathode, an auxiliary anode associated with the said tube anodes and located within said tube, an asymmetric condenser having one of its anodes connected across the said cathode and one of the pair of the tube anodes, and a connection from the said auxiliary anode to the cathode of the condenser.

7. In combination: a transformer having its primary connected across a source of alternating current, a gas discharge luminescent tube embodying a pair of anodes and a cathode, a secondary coil of said transformer connected across the cathode for energizing the same, a further secondary coil of the transformer connected across the two tube anodes and a connection from the neutral point of said further secondary coil to the said cathode, an auxiliary anode associated with the said tube anodes and located within said tube, an asymmetric condenser having one of its anodes connected across the said cathode and one of the pair of the tube anodes, a connection from the said auxiliary anode to the cathode of the condenser, and a third secondary coil of the transformer included in series in the said connection from the auxiliary anode to the cathode of the condenser.

8. The combination with an alternating current operated gas discharge luminescent tube and embodying anodes and a cathode; of means associated with the cathode of the tube for rectifying a portion of the current applied to said tube and a capacitor included in circuit with the rectifying means.

9. The combination with an alternating current operated gas discharge luminescent tube and embodying a pair of anodes and a cathode; of an additional anode associated with the cathode of the tube for rectifying a portion of the current applied to said tube, and a capacitor included in circuit with the said additional anode.

10. In combination: a transformer having its primary connected across a source of alternating current, a gas discharge luminescent tube embodying a pair of anodes and a cathode, a secondary coil of said transformer connected across the cathode for energizing the same, a further secondary coil of the transformer connected across the two tube anodes and a connection from the neutral point of said further secondary coil to the said cathode, an auxiliary anode associated with the said tube anodes and located within said tube, an external circuit including a lead connected to the said auxiliary anode and a lead connected to the neutral point of said further secondary coil, and electrical apparatus to which said leads are connected.

JULIUS EDGAR LILIENFELD.